Aug. 30, 1949.　　　　　W. L. RUSSELL　　　　2,480,674
NEUTRON METHOD OF POROSITY LOGGING
Filed April 13, 1944　　　　　　　　　　　　2 Sheets-Sheet 2

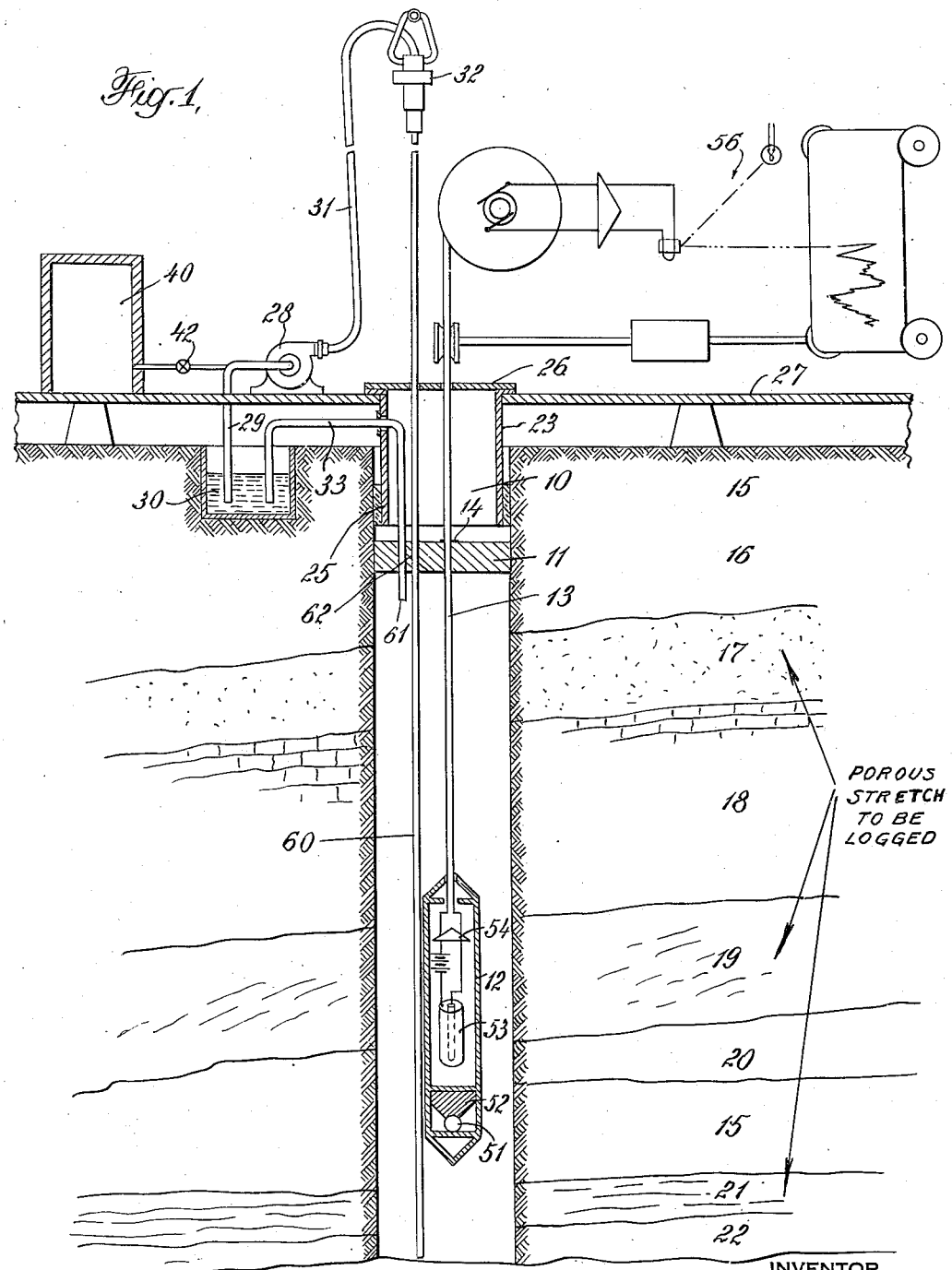

INVENTOR
WILLIAM L. RUSSELL
BY James Y. Cleveland
ATTORNEY

Patented Aug. 30, 1949

2,480,674

UNITED STATES PATENT OFFICE 2,480,674

NEUTRON METHOD OF POROSITY LOGGING

William L. Russell, Tulsa, Okla., assignor to Well Surveys, Incorporated, Tulsa, Okla., a corporation of Delaware Application April 13, 1944, Serial No. 530,795

16 Claims. (Cl. 250—83.6)

This invention relates to an improved method for logging wells or bore holes and particularly to a process for determining the position in a bore hole of the porous and permeable strata. The primary object of the invention is to provide a means for recording graphically the variations of porosity and permeability versus depth.

It is now generally recognized that accurate records of the variations of porosity in a well are highly valuable for the efficient operation of oil and gas wells. Oil and gas production is obtained only from the porous and permeable strata, and the rate of production and amount of oil recoverable per acre are determined by the porosity and permeability. The most valuable information regarding porosity and permeability would be furnished by continuous, graphic records showing their variations with depth in the rocks while in place in a well. The present invention discloses methods for obtaining such records.

Since the great value of porosity and permeability records became recognized, a number of methods have been developed to measure them. In many areas the self-potential curves of electrical logs have a marked relation to the permeability of the rocks, but in other extensive regions the self-potential curves are so much influenced by chemical effects due to the composition of the rocks that they are of little value for logging permeability or porosity. It has also been proposed to inject a radioactive substance into the permeable formations, and thereafter make a radioactivity log. The disadvantage of this method is the fact that the radioactive substances are very expensive, in some cases of short life or difficult or dangerous to handle.

Recently neutron logs have been proven of considerable value for logging porosity. The determinations of porosity made by this method are, however, influenced by the variations in the chemical character of the rock. There is thus a need for some method such as the present invention, which gives a graphic log of the porosity that is not influenced by the chemical nature of the containing rocks.

The object of the present invention, is, therefore, to improve on the several methods heretofore practiced in this art, and to explore the porosity of the strata encountered in the bore hole by a new method which is entirely unrelated to the prior methods.

Regarded in certain of its broader aspects, the novel process of well logging pursuant to the present invention comprises inserting into the bore under suitable pressure a fluid containing one or more elements differing in their effect on neutron radiation from the material they replace, and forcing this fluid into the porous and permeable strata surrounding the bore. Thereafter the relative quantities and locations of the retained substance may be measured by neutron well logging methods of any desired type.

It is not essential in the practice of this process that the well logging operations be performed before the well is cased because the material, retained by absorption or otherwise, will remain within the subterranean formations through which the well bore passes and can subsequently be detected through the casing, which, being made of iron or steel, is relatively transparent to neutrons. The logging of the well can be performed by moving, within a well bore, a radiation sensitive device such as a high pressure ionization chamber associated with appropriate amplifying and signal transmitting means, receiving the signal produced by said means, and recording the received signal in correlation with indications of depth.

The apparatus required to provide a physical embodiment of this invention comprises means for placing the material having the desired determined effect on neutron radiation within the interval being studied, and means for logging the interval to determine the secondary radiations caused by neutron radiation before and after the material has been so placed.

Other objects and advantages of the present invention may be seen from reading the following description and by reference to the accompanying drawings.

Figure 1 is a diagrammatic vertical sectional view of a well bore and neighboring strata.

Figure 2:
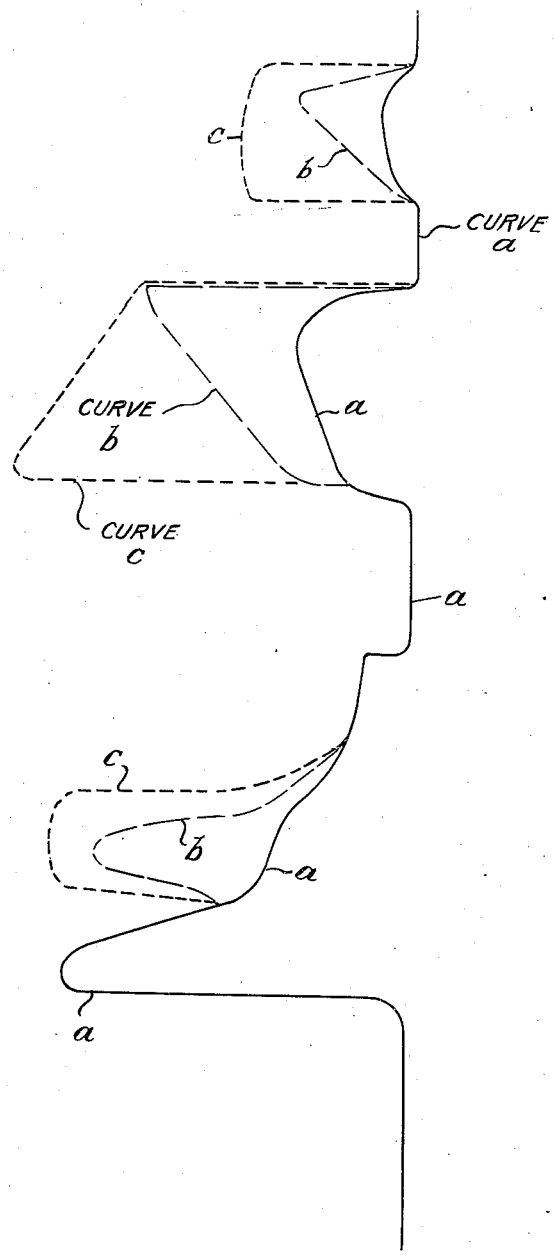
Figure 2 is a diagram showing a conventional neutron log of the well bore, a neutron log made shortly after the insertion of a material having determined properties when subjected to neutron radiation into the strata adjacent the well; and a neuron log made later after distribution of said material had taken place.

Three processes are involved in the present invention:

First, a neutron log is made and illustrated in Figure 2 by means of curve $a$; second, a substance having certain properties when subjected to neutron radiation is injected into the porous and permeable formations; and third, a second neutron log is made. The second neutron log is graphically shown in Figure 2 as a curve $b$. The first neutron log may have two uses: one is to show the general location of the porous strata, in case it may be desired to limit the injection of the neutron effective substance to certain very limited zones in the well, and the second use is combining the first and the second neutron log to show the porosity. By the use of the first neutron log, the location of the porous strata may be obtained, but the chemical effects may prevent an accurate determination of the porosity of these zones. The injection of the neutron sensitive substance may then be confined to those horizons which the first neutron log suggests may be porous, and which are suspected of containing oil or gas. By this means, the amount of neutron sensitive substance needed for the operation would be reduced.

The permeability of the formations may be measured by making three or more neutron logs of the portion of the well injected, one of the logs, such as the log $b$ in Figure 2, being made after the injection has commenced but when the injection had not continued for a sufficient time so that the full, final effect on the neutron log had occurred. Probably the best permeability measurements would be obtained by making the second, intermediate, neutron log when only 5 or 10 per cent of the ultimate effect on the neutron log had occurred. A third neutron log designated in Figure 2 by curve $c$ is made and represents the effect of the injection of the neutron sensitive substance after it has reached its final, equilibrium value in some of the more permeable strata. If the second neutron log is made when the equilibrium has been only partially attained, the difference between the first and second neutron logs is proportional to the permeability while the difference between the first and last is proportional to the porosity. If the neutron sensitive substances enter the permeable beds so fast there is no time to make the second neutron log during the injection, the invasion may be slowed down by dissolving or dispersing the neutron sensitive substance in a more viscous fluid.

The permeability and porosity would be indicated accurately by the neutron logs $b$ and $c$ alone if the neutron sensitive substance was injected into the porous formation in sufficient quantities so that the effect of the neutron sensitive substance on the neutron log was overwhelmingly greater than the effect of the variations in the neutron radiation properties of the solid portions of the reservoir. Ordinarily the two neutron logs, one made before, the other after, the introduction of the neutron sensitive substance, would be needed for comparison. The difference between the first and last logs is proportional to the porosity of the rock, provided that the fluid containing the neutron sensitive substance is injected into the porous strata for a time sufficiently long so that further injection produces no change in the neutron log.

The neutron sensitive substance injected into the permeable strata should have the following properties: It must be either a fluid itself, or soluble in the fluid in which it is immersed, or it must be so readily miscible in this fluid that it will enter fine pores and pass through them without being filtered out. Since the fluid used to carry the neutron sensitive substance would ordinarily be either water or mud fluid, it would be desirable that the neutron sensitive substance be soluble in water, if it is a solid, or miscible with the water, if it is a liquid mingled with water. The neutron sensitive substance may be a liquid or a gas. Its physical properties may be defined as follows: either it is a fluid, or it is soluble in water or some other fluid convenient for injection, or, if it is a non-soluble solid, it may be dispersed in water so evenly and in such small particles that the mixture acts like a fluid in invading the permeable rocks.

The essential property of the neutron sensitive substance is that it must differ in neutron effective properties from the fluid it replaces on entering the permeable strata to such an extent that a measurable difference is produced on neutron logs. The manner in which this difference occurs is not essential. However, there are three ways in which the differences in the properties of the neutron sensitive substance introduced could affect the neutron logs: (A) By changing the rate at which fast neutrons from the source are slowed down; this is, of course, largely a matter of the hydrogen concentration; (B) by variations in the cross-section of the elements for slow neutrons, and (C), by variations in the strength of the gamma rays of capture emitted when the neutrons are absorbed. This last is, of course, also conditioned by the cross-sections for slow neutrons. An example of a fluid which would affect the rate of slowing down of fast neutrons if injected into the rock is any gas or any liquid free from hydrogen, such as carbon tetrachloride. The injection of these substances would ordinarily increase the ionization with the distances between source and ionization chamber normally used. If the elements inserted showed a marked contrast in the cross-section for slow neutrons compared with the elements they replaced this would also be likely to produce an effect on the neutron logs. Generally, the change in the ionization due to the injection of the neutron sensitive element into the porous strata would be produced by the difference in the gamma rays of capture. The most favorable qualities for the neutron sensitive substance to be injected would be a large cross-section for slow neutrons and gamma rays of capture either much stronger or much weaker than the substances in the displaced fluids. The element boron has both these qualities, for its gamma rays of capture are weak or wanting and it has a very large capture cross-section for slow neutrons. It is also reasonably cheap, and boric acid is soluble in water. Accordingly, boric acid or some other boron compound would seem to be a suitable substance to inject into the formations, and in the remainder of the description it will be assumed that boric acid is the neutron sensitive substance used. It should be understood that this is only one of a number of possible substances, and that it is not intended to limit the choice of elements to boron. Certain advantages might be obtained by substituting an element with a large cross-section for slow neutrons and unusually strong gamma rays of capture, compared with the gamma rays of the elements in the fluids displaced by the injected fluid.

Since a rotary rig is generally set up over the well in which the fluid is to be injected, a convenient way to inject it would be to mix the boric acid with the mud fluid circulated in the well. The boric acid solution could be forced into the well through the drill pipe, or a tubing or hose, the bottom of which should be positioned below the horizons which are to receive the injection, so that as the boric acid solution issues from the lower ends of the pipes or tubing it will rise up past these horizons, displacing the original fluids within the well. Since the hydrostatic pressure of the mud fluid in the well is generally greater than the hydrostatic pressure of the fluids in the porous rocks, merely introducing boric acid solution into the mud fluid in the well would ensure that it would enter the permeable rocks. However, there may be some objections to this method of introducing the boric acid. The expense of mixing boric acid in required concentrations in a large volume of mud fluid may be too great, the boric acid may enter the formations too slowly, or the mud cake forming on the surfaces of the permeable strata may interfere with the action of the process. It may, therefore, be necessary to apply hydrostatic pressure on the boric acid solution at the surface, in order to cause the fluid to enter the formations more rapidly. It may also be necessary to remove both the mud cake and mud fluid and substitute a clear solution.

The walls of a well in which mud fluid is standing are coated with a layer or sheath of mud, which is apt to be thicker over the permeable strata than elsewhere. Since this mud sheath is ordinarily less permeable than the producing oil and gas horizons, it will control the rate at which the boric acid enters the permeable strata. Thus the mud sheath may prevent the measurement of permeability unless it has first been removed.

The mud sheath covering the surfaces of the porous and permeable formations has a very important effect on the methods embodied in this invention. This mud sheath will vary in its permeability in different parts of the well at the same time, and from one well to another. It is possible to control to some extent the permeability of this mud sheath, for certain substances, such as aquagel, render it extremely impermeable.

Generally, the permeability of the mud sheath will be much less than the permeability of the porous rocks likely to produce oil or gas, and accordingly if this mud sheath is not removed before injecting the boric acid, it will be the permeability of mud sheath, and not the permeability of the rocks, which will be measured. It will therefore be necessary to remove the mud sheath before measuring permeability by this method. This means that if permeability is to be measured it will be necessary to remove the mud sheath by reducing the hydrostatic pressure of the fluid in the well to below the hydrostatic pressure of the fluid in the rock, and allowing the flow of fluid into the well to clean away the mud sheath. It will also be necessary to replace the mud fluid by some fluid without mud if the method for measuring permeability by the boric acid is to be used.

The mud sheath does not prevent the use of the methods of this invention to measure porosity, but it determines the time needed to inject the neutron sensitive fluid to obtain a good measurement. If it is necessary to make two logs, one before and one after the injection of the boric acid, the time element is important because of rig-time charges. It will therefore be advisable to keep the permeability of the mud sheath low enough so that the time needed for the boric acid to pass through it will not result in excessive charges for rig time.

If the permeability of the mud sheath is so low that the charges for rig time would be excessive, it would be possible to eliminate this expense by mixing the liquid causing the neutronic effect with the mud fluid as soon as the horizons whose porosity was to be logged were penetrated, and maintain this neutronic liquid in the mud fluid until the neutron log was made. If this method were adopted, it would be necessary to distinguish the effect of the injected neutronic substance from the ionization due to other causes. This may be done if the effect of the neutronic substance is so large that the other effects are negligible.

The ways in which the boric acid may be introduced into the well may be listed as follows:

1. Introduced into the mud fluid, followed by circulation, as during drilling, and allowing the hydrostatic pressure of the mud fluid to force the boric acid into the permeable strata.

2. Introduction into the mud fluid circulation, and the use of hydrostatic pressure at the surface to produce a more rapid entry of the boric acid into the formation.

3. Lowering tubing or hose into the well to a depth below the lowest horizon to be measured, forcing boric acid through the hose until the boric acid has risen in the well to above the highest stratum to be tested, and allowing the hydrostatic pressure of the fluid to force the boric acid into the rock, or else applying pressure at the surface. In applying this method a packer is inserted above the highest stratum to be measured, with two pipes passing through the packer, one ending just below it, the other extending down to just below the lowest horizon to be measured. The boric acid solution is forced in through one pipe and out through the other, until the original fluid within the well has been displaced. Then after fluid has entered the formation for a time sufficient to enable the permeable rocks to be invaded a neutron log is made.

4. Removing the mud fluid and mud cake and substituting a clear solution.

A diagram of the general arrangement for practicing the invention is shown in Figure 1, in which 10 indicates the bore hole casing, 11 a packer, 12 the exploring instrument, suspended from the cable 13, passing through a tight opening 14 in the packer.

The bore hole extends successively through the layers 16, 17, 18, 19, 20, 21 and 22 out of which the layers 17, 19 and 21 are porous. These layers have been shown symbolically and have been arbitrarily chosen, merely for the purpose of illustration; manifestly, the bore may traverse different types of subsurface strata or formations and the particular locality in which the bore 10 is drilled determines the geologic section encountered.

The bore hole may have a short length of casing 23 at the surface and cemented at 25, but where the characteristics of the formation surrounding the drill hole are to be determined, the major portion of the bore should be uncased. Secured to the upper end of the casing is a head 26 supported in a suitable manner by a steel platform 27. The arrangement, as shown in the figure comprises a pump 28 which has its low pressure side connected by means of a pipe 29 to a drilling fluid supply pit 30 and has its high pressure side connected through a pipe 31, with the swivel 32 supported on the derrick.

It is understood that, during drilling, the swivel 32 normally supports the drill string and drill bit, which may be disconnected and removed, as shown in Figure 1, and that the circulation of the mud flush during drilling is effected from pit 30 through pipe 29, pump 28, pipe 31, swivel 32 downwards through the drill string and drill bit, upwards through the space between the drill string and the walls of the bore hole 10, and back to pit 30 through pipe 33. A tank or reservoir 40 may be connected, through a pipe 41 having a valve 42 with the mud flush circuit. The tank is filled with a solution of boric acid or any other suitable material having the desired properties when subjected to neutron radiation.

The process used in this method deals with logging the formations traversed by the drill hole by means of neutrons in a manner described in the U. S. Patent No. 2,308,361 on Well logging method and device issued on January 12, 1943 to R. E. Fearon and which consists in subjecting the rocks surrounding the well to a penetrating bombardment of artifically produced neutrons, and measuring the effect on a detector (known as the ionization chamber) located a short distance above the neutron source. Therefore, after drilling the bore hole to any desired depth, as shown in Figure 1, I lower into the bore hole an exploring instrument containing a source of neutrons, and an ionization chamber, the response of which indicates the influence of the neighboring formation upon the stream of neutrons. The neutron well logging instrument is well known in the art and may be of the type illustrated in the aforementioned U. S. Patent No. 2,308,361 issued to R. E. Fearon. For example, the instrument may include a housing 12, the lower portion of which contains a source of neutrons 51, such as for instance a mixture of radium and beryllium, a shield 52 above the source and an ionization chamber 53 arranged above the shield 52. The ionization chamber is electrically connected through an amplifier and a cable 13 to a suitable recording instrument 56 producing automatically a compound graph representing the output of the ionization chamber for various depths of the housing 50. Actual construction of such instrument forms no part of the present invention and since descriptions of them are available elsewhere, no further description of them will be given in the present application.

As the exploring instrument is lowered or raised in the bore hole or any particular desired portion thereof, by means of the cable 13, the indications of the ionization chamber 53 will be transmitted to the recorder at the surface and will indicate primarily the amount of hydrogen regardless of whether it is in the pore space or in chemical combination in the molecules of such substances in the rocks. The substances in the strata which are rich in hydrogen are oil and water. It is because oil and water occur in the pore spaces of rocks that neutron logs are so useful for logging porosity.

After the neutron log of the type shown in Figure 2, curve a, has been obtained it is desired to introduce into the mud flush filling the bore hole, the neutron absorbing substance, such as the solution of boric acid which is stored in the container 40 and to allow this solution to enter through the mud sheath covering the walls of the bore hole into the formations immediately behind said mud sheath. This can be effected by opening the valve 42, and thus establishing connection between the reservoir 40 and the pump 25. As a result of this connection the boric acid contained in the tank 40 becomes injected into the stream of mud flush circulated in the bore hole, by the pump 25, and is introduced in the immediate neighborhood of the formations surrounding the bore hole. Because of the pressure applied by the pump 25 and because of the hydrostatic pressure of the fluid column the boric acid solution will enter any pervious rocks.

The boric acid is forced down tubing 60, extending through the packer, until all the original liquid in the well has been displaced through tubing 61. Then a sufficient time is allowed to lapse for the boric acid solution to enter the rock, after which tubing 60 is raised until its bottom is just below the packer. Then the neutron log is made over the desired interval. The opening through the packer at 14 allows the cable 13 supporting the well-logging instrument to be drawn through it but the cable fits this opening so tightly that very little of the boric acid escapes through this opening and the similar opening for the tubing 60 in the packer 11 at 62. During the operation boric acid must be continually forced through the tubing 60 in order to compensate for the loss of boric acid through openings 14 and 62, and to maintain the hydrostatic pressure within the well below the packer.

Figure 3:
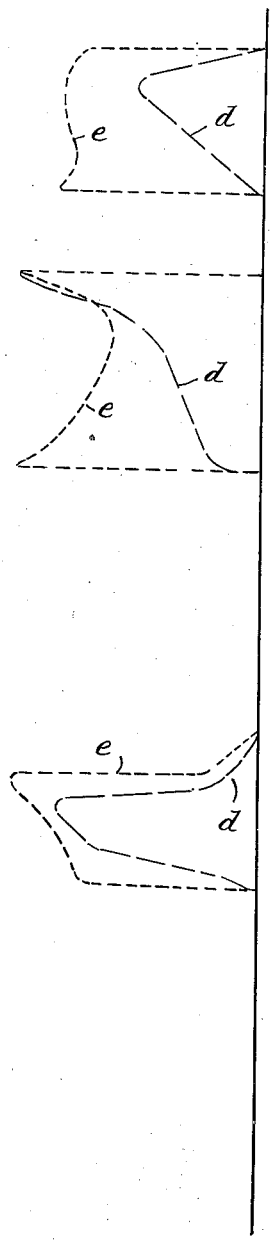
Figure 3 shows the true porosity and the true permeability log of the well.

Figure 2 shows imaginary neutron logs and interpretation to illustrate the principles involved. Curve a is the first neutron log run, before any boric acid is injected. Curve b is run before enough boric acid has entered the permeable strata to produce more than a small fraction of its total final effect on the neutron log. The difference between curve a and curve b is proportional to the permeability, provided that the mud sheath covering the permeable rocks has been removed before injecting the boric acid. Curve c is assumed to be run after so much boric acid has entered the rocks that the addition of more does not affect the neutron log appreciably. The difference between curve a and curve c is proportional to the porosity. In Figure 3 the curve e at the left shows the true porosity, and curve d the true permeability.

If it is necessary to get rid of the mud sheath, this may be done by reducing the hydrostatic pressure so that fluids flow from the permeable rocks into the well, or by flushing or eroding the walls.

If the boric acid between the instrument and the walls of the hole interferes with the logging, it may be removed by one of the following processes: flushing it out; displacing it by surrounding the instrument with a soft or flexible sheath, as of rubber, which fits closely to the walls. It the well is of the same diameter throughout the portion logged, the effect of the boric acid will be the same everywhere, and may not be serious for this reason. If the boric acid is flushed out, it may be necessary to do the flushing with a substance like aquagel, which seals the walls of the hole and prevents the flushing fluid from entering the permeable strata.

If it is desired to use this process to log porosity and permeability through the casing it will be necessary to perforate the interval to be logged. The desired liquid may then be forced into the formation through the perforations, and the logging operations carried out as explained above. In a similar way, the present process may be carried out in casing strings provided with perforated sections, perforated liners, or screens, in a manner that will be understood by those familiar with operations attendant the production of petroleum.

It would, of course, be expensive to perforate a whole string of casing. However, by running a neutron or neutron and radioactivity log first, it should be possible to select certain narrow zones which are most likely to produce oil and gas and therefore of greatest interest; perforating only those zones should not be unduly expensive. It is also possible to use this method to measure the hydrostatic pressure in porous rocks because the fluid will not enter the porous formations until the hydrostatic pressure of the column of water in the hole is greater than the pressure of the fluid in the rocks.

I claim:

1. Method of exploration of geological formations comprising the step of measuring radiations in the neighborhood of said formations and caused by nuclear disintegration of elements therein contained, the step of impregnating said formations with a properly selected substance having a stable nucleus and adapted to modify said disintegration, the step of measuring radiations caused by nuclear disintegration as affected by the presence of said substance in said formations, and comparing the measurements obtained in said first and said third step.

2. Method of prospecting geological formations comprising irradiating said formations with neutrons and subsequently measuring the response of said formations to neutrons, introducing into said formations a selected substance having a stable nucleus and capable of modifying said response in a known manner and thereafter measuring again the response of said formations and comparing said response before and after introduction of said substance.

3. Method of exploration of geologic formations, comprising irradiating said formations with primary radiations, measuring gamma radiations representing the response of said formations to said primary radiations, introducing into said formations a substance having a stable nucleus and capable of modifying said response in a known manner and thereafter again irradiating said formations with primary radiation, measuring again gamma radiations representing the response of said formations to said primary radiations, and comparing the measurements of gamma radiations before and after the introduction of said substance.

4. In a method of exploration of geologic formations by irradiating said formations with selected primary radiations and determining the secondary radiations caused by the interaction of said primary radiations with said formations and in which said formations are known to cause secondary radiations that are contained within a determined range of characteristics, the step of introducing into said formations a substance that is known to cause secondary radiations that depart from said determined range when irradiated with selected primary radiations and thereafter determining the distribution of said substance in said formations by irradiating said formations with said selected radiations and measuring the resulting secondary radiations at at least two spaced points positioned in the neighborhood of said formations.

5. In a method of exploration of geological formations by irradiating said formations with neutrons and determining the secondary radiations caused by the interaction of neutrons with said formations in which said formations are known to cause secondary radiations that are contained within a determined range of characteristics, the step of introducing into said formations a substance that is known to cause secondary radiations that depart from said determined range when irradiated with neutrons, and thereafter determining the distribution of said substance in said formation by irradiating said formations with neutrons and measuring the resultant secondary radiations at at least two spaced points positioned in the neighborhood of said formations.

6. In a method of exploration of geological formations by irradiating said formations with selected primary radiations caused by the nuclear disintegration of a substance positioned in the neighborhood of said formations and determining the gamma radiations caused by the interaction of said primary radiations with said formations and in which said formations are known to cause gamma radiations that are contained within a determined range of intensities, the step of introducing into said formations a substance that is known to cause gamma radiations that depart from said determined range when irradiated with selected primary radiations and thereafter determining the distribution of said substance in said formations by irradiating said formations with said primary radiations and measuring the resultant gamma radiations at at least two spaced points positioned in the neighborhood of said formations.

7. In a method of exploring geologic formations traversed by a drill hole by irradiating said formations with neutrons and determining the secondary radiations caused by the interaction of neutrons with said formations and in which said formations are known to cause secondary radiations that are contained within a determined range of characteristics, the step of lowering into the said hole a source of neutrons, the step of impregnating said formations with a substance having a stable nucleus and that is known to cause secondary radiations when irradiated with neutrons that depart from said determined range, the step of measuring said secondary radiations at various depths and correlating the measurements within corresponding depths.

8. A method of logging a drill hole comprising lowering in said hole a source of neutrons, measuring at various depths of said hole gamma radiations representing the response of formations surrounding said hole to said neutrons, introducing into said formations a substance having a stable nucleus and capable of modifying said response in a known manner and thereafter again irradiating said formations with neutrons, measuring again said gamma radiations at said various depths, comparing the measurements of said secondary radiations before and after introduction of said substance and correlating the results of said measurements with the corresponding depths.

9. Method of measuring the permeability of strata traversed by drill holes comprising producing a log of said drill hole, said log representing variations of the response of said strata to selected radiations, said variations being represented with respect to the depth of said hole, forcing into said strata a substance having a stable nucleus and giving a measurable effect on said log and before enough of the substance has entered the strata to exert the full effect on said log, making a second log.

10. Method of measuring the porosity of strata in a well by making a neutron log, injecting into the porous formations a substance having a stable neucleus and which produces a measurable effect on the neutron log, and thereafter making another neutron log.

11. Measuring permeability by making a neutron log, removing the mud sheath from the permeable rocks, forcing a substance having a stable nucleus and giving a measureable effect on the neutron log into the permeable strata, and, before enough of this substance has entered the strata to exert the full effect on the neutron log, making a second neutron log.

12. In a method of exploration of geological formations by means of an instrument adapted to indicate neutron absorbing properties of substances placed in the neighborhood of said instrument, said strata having neutron absorbing properties that are contained within a known range, the step of impregnating said strata with a known substance having a stable nucleus, said substance having neutron absorbing properties that are outside of said range, thereafter moving said instrument in the neighborhood of said strata, whereby the varying indications produced by the motion of said instrument represent the distribution of said substance.

13. Methods of geophysical exploration comprising introducing water soluble neutron absorbing material having a stable nucleus into a well whereby distribution and retention of said material in surrounding subterranean strata occurs in varying degrees proportional to the different porosities of the strata, removing said material not thus retained, and thereafter measuring the relative quantities of the retained material by neutron well logging methods.

14. In a method for logging bore holes that comprises the step of drilling a bore hole while circulating therein a drilling fluid comprising a material having neutron absorbing characteristics, allowing said drilling fluid to penetrate the formation traversed by the bore hole by an amount dependent on the respective porosity properties of said formation, lowering into the bore hole a source of neutrons and a detector sensitive to radiations caused by the interaction of the neutrons with the surrounding formations and indicating at the levels of the different formations the response of the detector to said radiations.

15. In a method for logging bore holes the step of drilling a bore hole, while circulating therein a mud flush comprising a boron compound, allowing said mud flush to enter into the formation surrounding the bore hole, lowering into the bore hole a source of neutrons and a detector sensitive to radiations caused by said neutrons and indicating the response of said detector to the effect of the boron compound incorporated in said formations.

16. In the production of oil from a subsurface formation through a bore hole in which an extraneous material is placed in the bore hole and it is desired to determine the position which such material assumes in the bore hole, the step of producing nuclear disintegrations in said material after said material has been placed in its position in the bore hole whereby its position therein may be determined by passing through the bore hole a device which is sensitive to gamma radiations resulting from said nuclear disintegration.

WILLIAM L. RUSSELL.

REFERENCES CITED

The following references are of record in the file of this patent:

UNITED STATES PATENTS

| Number | Name | Date |
|---|---|---|
| 2,231,577 | Hare | Feb. 11, 1941 |
| 2,335,409 | Hare | Nov. 30, 1943 |
| 2,339,129 | Albertson | Jan. 11, 1944 |
| 2,341,581 | Teichmann | Feb. 15, 1944 |
| 2,349,712 | Fearon | May 23, 1944 |
| 2,350,154 | Dawson | May 30, 1944 |
| 2,352,993 | Albertson | July 4, 1944 |
| 2,358,945 | Teichmann | Sept. 26, 1944 |